United States Patent [19]
Abe et al.

[11] Patent Number: 4,666,016
[45] Date of Patent: May 19, 1987

[54] POWER UNIT MOUNTING DEVICE

[75] Inventors: Eiichi Abe, Kamakura; Shin Takehara, Machida, both of Japan

[73] Assignee: Nissan Motor Co., Ltd., Yokohama, Japan

[21] Appl. No.: 710,668

[22] Filed: Mar. 12, 1985

[30] Foreign Application Priority Data

Mar. 13, 1984 [JP] Japan .................................. 59-46441

[51] Int. Cl.⁴ .............................................. B60K 5/12
[52] U.S. Cl. ..................................... 180/291; 248/566; 248/636; 267/64.28; 267/140.1
[58] Field of Search ............... 180/299, 291, 312, 902; 248/636, 550, 566; 267/140.1, 64.28; 188/299, 285

[56] References Cited

U.S. PATENT DOCUMENTS 4,154,206  5/1979  LeSalver ............................ 180/291
4,265,136  5/1981  Rieglar ................................ 248/550
4,516,545  5/1985  Kumagai ............................ 180/312

FOREIGN PATENT DOCUMENTS 0077195  4/1983  European Pat. Off. ............ 180/312
0082633  7/1981  Japan ................................... 180/291
0077223  5/1982  Japan ................................... 180/291

Primary Examiner—John J. Love
Assistant Examiner—Eric D. Culbreth
Attorney, Agent, or Firm—Schwartz, Jeffery, Schwaab, Mack, Blumenthal & Evans

[57] ABSTRACT

An improved power unit mounting device capable of dumping in a wide range of frequency of vibration. The device having an inner liquid chamber comprises an auxiliary chamber provided on a chassis separately from the mounting device proper. The mounting device proper is formed with the inner chamber communicating with the auxiliary chamber through a plurality of fluid channels.

11 Claims, 4 Drawing Figures

POWER UNIT MOUNTING DEVICE

BACkGROUND OF THE INVENTION

1. Field of the Invention

The present invention relates to a power unit mounting device.

2. Description of the Present Art

Power unit mounting devices are well known in the art. Examples of such are disclosed in Japanese Patent Published Application No. Sho 58-72740. A conventional mounting device as shown therein includes an inner space which is divided by a partition plate into two chambers communicating with each other by means of an orifice formed on the plate. However in this type of conventional mounting device, design on the orifice is significantly restricted because it must be made inside the mounting device. Thereby it is difficult to adjust the damping capacity of the mounting device to reduce vibrations of certain frequencies.

SUMMARY OF THE INVENTION

An object of the present invention is to provide, with due consideration to the drawbacks of such conventional devices, a solution to the above-mentioned problems.

Another object of the invention is to provide a power unit mounting device having damping capacity at the desired frequency.

A further object of the invention is to provide a power unit mounting device with an extremely wide degree of freedom in setting the frequency range which gives the damping action.

Briefly described, this and other objects of the present invention are accomplished by the provision of a mounting device body and a secondary chamber in a separate body, which communicate through a plurality of fluid channels, which act as an orifice to cause the damping capacity to differ in the fluid chamber in the mounting device body chamber and in the secondary chamber, so that by selectively switching the communication of these fluid channels, a high damping operation is obtained at the desired frequencies

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

To facilitate the understanding of the present invention, a brief reference will be made to a conventional device.

Figure 1:
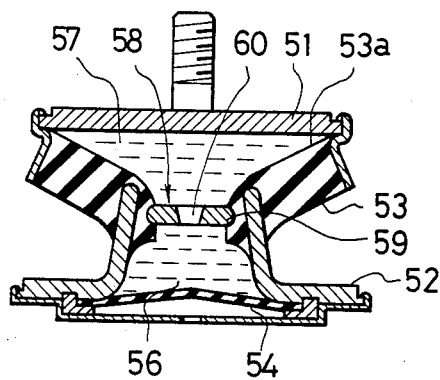
FIG. 1 is a sectional drawing of a conventional power unit mounting device.

Referring to FIG. 1, a conventional power unit mounting device is illustrated. That is, mounting rubber 53 which contains an internal space 53a enclosing a fluid is secured between a power unit side base plate 51 and a chassis-side base plate 52. A diaphragm 54 and a partition plate 59 are secured to the base plate 52, forming a secondary chamber 56 on the diaphragm 54 side. A fluid chamber 57 is formed on the other base plate 51. The fluid chamber 57 and the secondary chamber 56 communicate by means of an orifice 60 which is formed in the partition plate 59.

However, in this type of conventional mounting device, an orifice 60, through which the fluid chamber 57 and the secondary chamber 56 communicate, is built into the mounting device. For this reason, the shape of the orifice is limited, and the problem arises that, in the orifice 60, the degree of freedom of selection of the desired frequencies to provide a damping effect is extremely limited.

Here, a fequency fl, at which a maximum value for the damping capability of the orifice is shown, is dependent on the mass of the fluid in the orifice and the diameter of the orifice. The larger this mass, the smaller the frequency fl, and the smaller the diameter, the smaller the frequency fl becomes.

Following is a description of the preferred embodiment of the present invention, with reference to the drawings.

Figure 2:
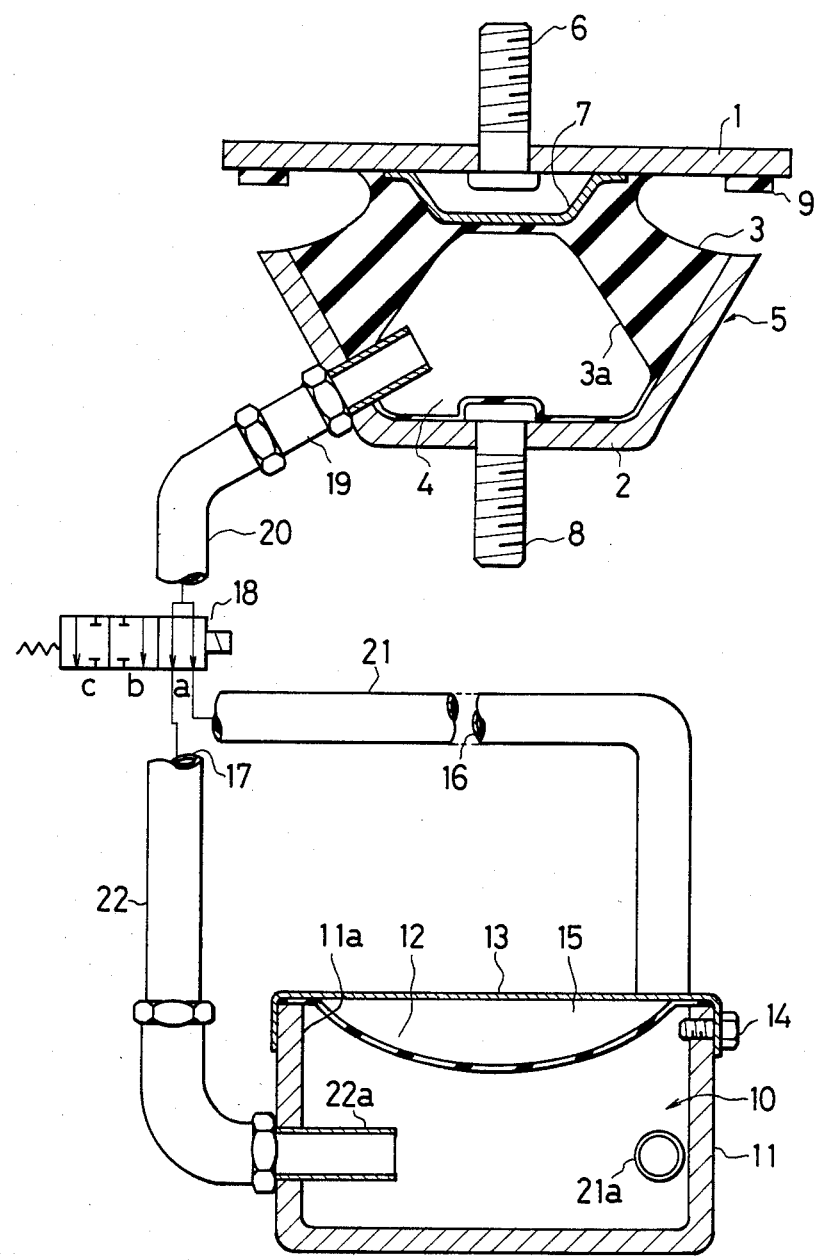
FIG. 2 is a sectional drawing showing a first embodiment of the present invention.

FIG. 2 is a sectional drawing showing a first embodiment of the present invention. A mounting rubber 3 which has an internal space 3a is secured between a power unit side base plate 1 and a chassis side base plate 2 using a vulcanized adhesive. A fluid such as water, oil, etc., is enclosed in the internal space 3a to form a fluid chamber 4, comprising a mounting device body 5. Specifically, a supporting plate 7, which covers a bolt 6 which mounts the base plate 1 to a power unit which is not shown on the drawing, is welded to the base plate 1. The mounting rubber 3 is secured between the supporting plate 7 and the conical inner side surface of the base plate 2. A mounting bolt 8 mounts the base plate 2 on a chassis which is not shown on the drawing. A stopper bar 9 regulates excess displacement of the base plates 1 and 2.

A secondary chamber 10 is formed separately from the mounting device main body 5 and is secured to a part of the chassis, such as a side member. That is, an upper open mouth 11a of a container 11 is covered by a diaphragm 12, and a cover plate 13 is mounted by a bolt 14. The container 11 is partitioned in a watertight manner by the diaphragm 12, and forms the secondary chamber 10 which encloses the liquid. An air chamber 15, which is used as an elastic body, is outlined between the diaphragm 12 and the cover plate 13 and forms an auxiliary oscillating system. However, a through-hole can be formed in the cover plate 13 so that the auxiliary oscillating system is formed by the diaphragm plate 12 only. Further, it is desired that the secondary chamber 10 is mounted to the chassis through an elastic body, to provide a vibration prevention means.

The fluid chamber 4 and the secondary chamber 10 communicate through a plurality of fluid channels 16 and 17, and a selector valve 18 is provided so that the fluid channels 16 and 17 can be selectively opened and closed. One end of a main pipe member 20 is joined to the fluid chamber 4 by a coupling 19 mounted on the base plate 2 on the chassis side. One end of each of a plurality of auxiliary pipe members 21 and 22 is connected to the other end of the main pipe member 20 through the selector valve 18, which is a solenoid valve, while the other end 21a and 22a of the secondary pipe members 21 and 22 are connected to the auxiliary chamber 10. Liquid is enclosed in the main pipe member 20 and in each of the auxiliary pipe members 21 and 22. The main pipe member 20 and the auxiliary pipe member 21 form the first liquid channel 16 while the main pipe member 20 and the auxiliary pipe member 22 form the second fluid channel 17. In this embodiment of the present invention, the main pipe member 20 and the auxiliary pipe member 21 and 22 have the same internal diameter, forming an orifice which acts to constrict the fluid channel throughout the full length of the pipes. Changing the length of the auxiliary pipe members 21 and 22 changes their characteristics as orifices.

In addition, the selector valve 18, which can assume a plurality of switching positions a, b, and c, is provided in the section where the main pipe member 20 joins the auxiliary pipe members 21 and 22, and can be switched to join one or both of the auxiliary pipe members 21, 22 to the main pipe member 20.

Next we will explain the operation of the embodiment of the present invention.

By means of the mounting device main body 5, the power unit is flexibly joined to the chassis, and if the selector valve 18 assumes the position a, the fluid chamber 4, by means of the main pipe member 20 and the auxiliary pipe members 21 and 22 is caused to communicate with the secondary chamber. The fluid mass inside the first and second fluid channels 16 and 17, which act as orifices, becomes a maximum.

Figure 4:
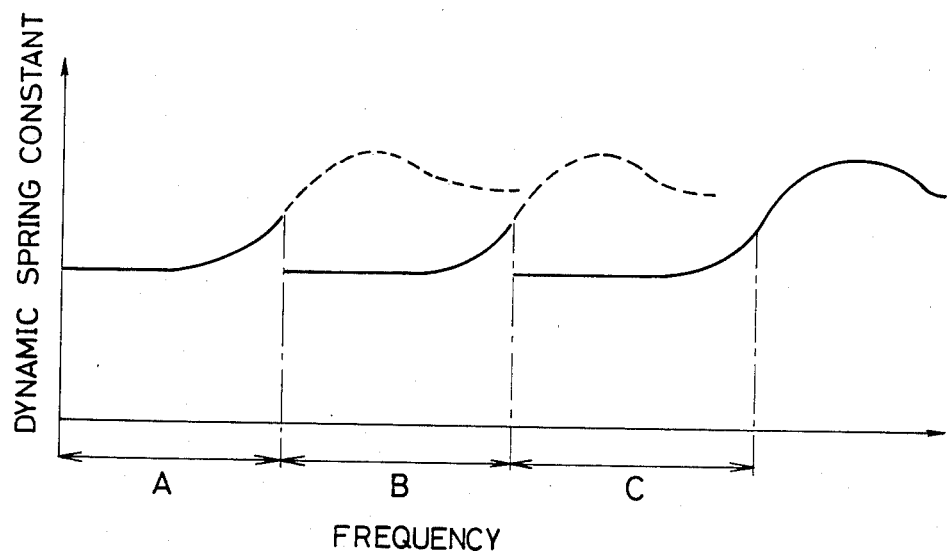
FIG. 4 is a graph showing the relationship between frequency and dynamic spring constant characteristics for the first embodiment of the present invention.

Accordingly, receiving the vibration input in the comparatively low frequency range A from the base plate 1, the mounting rubber 3 expands and contracts and a volumetric change is produced in the fluid chamber 4, upon which the fluid mass inside both fluid channels 16 and 17 resonates, producing a large damping force which causes damping. However, as shown by the broken line in FIG. 4, the dynamic spring constant value of the mounting device main body 5 begins to rise in the latter half of the frequency range A.

For this reason, in opposition to the vibration input to the high frequency range B adjacent to the frequency range A, the selector valve 18 assumes the b position, and the second fluid channel 17 is closed, so that the fluid mass decreases. A damping force is produced at the first fluid channel 16 of which the capacity is larger than the second fluid channel 17. As a result, a high damping action is also obtained in the frequency range B.

Further, when the selector valve 18 assumes the c position, the fluid mass reaches its minimum and a damping force can be produced at the second fluid channel 17 in the frequency range C.

In this way, by providing the mounting device 5 which incorporates the fluid chamber 4, and the secondary chamber 10 as separate bodies, they can be easily made to communicate through the plurality of fluid channels 16 and 17. The lengths of the main pipe member 20 and the auxiliary members 21 and 22, which together comprise the fluid channels 16 and 17, are made comparatively long, and their diameter is made relatively large, so that it is possible to get a high damping action in a broad low frequency range. Accordingly, by adjusting the frequency ranges A, B and C, for example, throughout the 5 to 13 Hz range, the phenomenon of engine shaking, produced in this frequency range, can be reliably presented.

Figure 3:
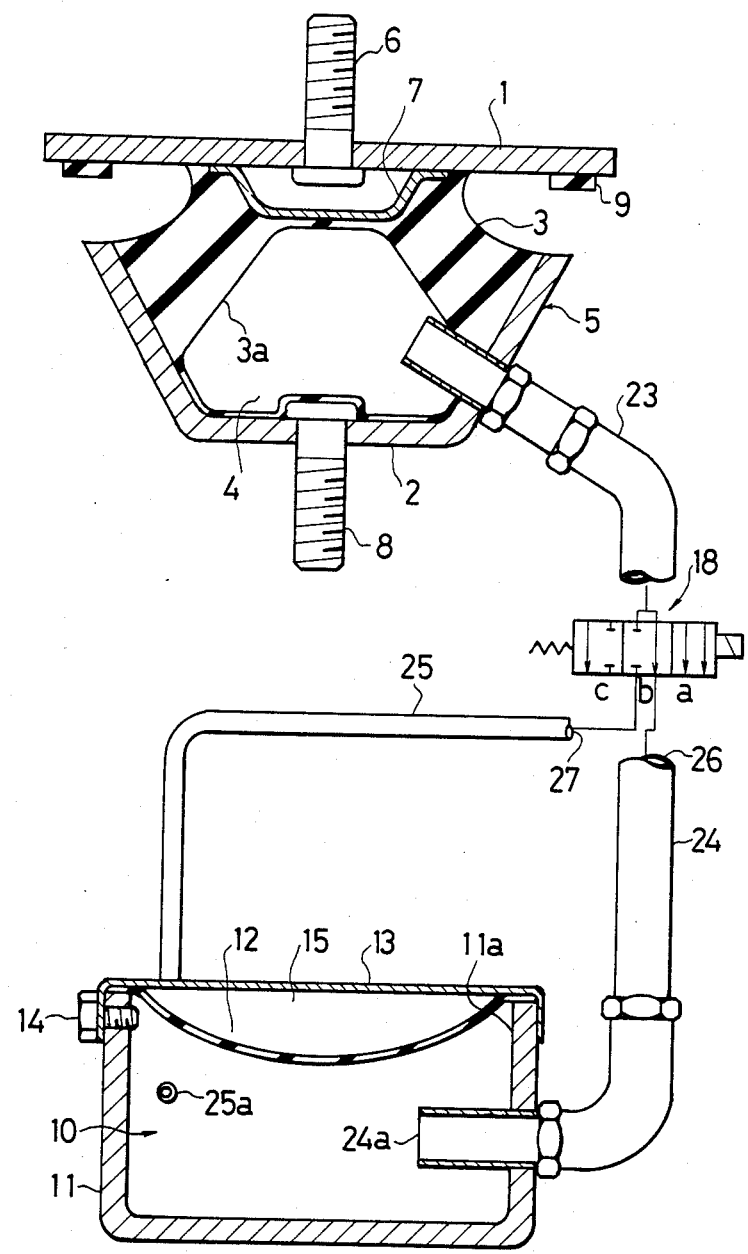
FIG. 3 is a sectional drawing showing a second embodiment of the present invention.

FIG. 3 shows a second embodiment of the present invention. The construction of the mounting device main body 5, the secondary chamber 10, and the selector valve 18 is the same as for the first embodiment of the present invention. The same references have been used and a detailed explanation will be omitted here.

In this embodiment, the lengths and diameters of a plurality of auxiliary pipe members 24 and 25, which are connected to a main pipe member 23 and terminate the secondary chamber 10 at their ends 24a and 25a, are made different, and a first fluid channel 26, which acts as an orifice having a constant diameter throughout the full length of the pipes, comprises the main pipe member 23 and the auxiliary pipe member 24, while a second fluid channel 27, which acts as an orifice having two diameters, comprises the main pipe member 23 and the auxiliary pipe member 25, which has a capacity smaller than that of the auxiliary pipe member 24.

By means of this embodiment, by the switching action of the selector valve 18 to the positions a, b, and c, in order, in addition to obtaining the same operation as for the first embodiment, in the case where the selector valve 18 is caused to assume the position b, the large diameter second fluid channel 26 opens, and in the case where the selector valve 18 is caused to assume the position c, the second fluid channel 27 opens, so that it is easy to obtain a damping action in a discontinuous frequency range. Accordingly, by adjusting the length and the diameter of the fluid channels 26 and 27, a damping force is easily produced to prevent engine shaking at the respective a, b and c positions of the selector valve 18, medium speed engine shaking, and high speed engine shaking.

Further, in each of the above embodiments of the present invention, the selector valve 18 can be a selector valve which is activated by a negative pressure actuator, which is in turn activated by a negative engine pressure, or it can be a manually operated selector valve. In addition, the switching action of the selector valve 18 can be coupled to the vehicle speed, or, in order to carry out damping of the power unit when the vehicle starts to run, when stopped, and when accelerating and decelerating, can be made to act according to the position of the carburetor throttle or position of the gearshift lever.

Although the fluid contained in the chambers of the above embodiment is a liquid, gaseous substances, such as air, are also used. In the latter case, a diaphragm can be dispensed with because gas is able to absorb volumetric change of a chamber containing it.

It is intended, therefore, that all matter contained in the foregoing description and in the drawings shall be interpreted as illustrative only, and not as limitative of the invention.

What is claimed is:

1. A power unit mounting device comprising:
a power unit side base plate;
a chassis side base plate;
a mounting rubber provided between and secured to both the plates to elastically connect the plates with each other, and being formed with an internal space confined by both base plates and the mounting rubber:
an auxiliary chamber fixed to the chassis of a vehicle, said internal space and said auxiliary chamber being filled with a fluid;
a plurality of fluid channels communicating the internal space to the inside of the auxiliary chamber, the fluid masses in the channels being different from each other; and a selector valve for selectively opening and closing the fluid channels;

said plurality of fluid channels consisting of a main channel communicating with the internal space at one end, and a plurality of auxiliary channels connected to the main channel through the selector valve at the other end of the main channel, each auxiliary channel communicating with the auxiliary chamber to establish one of the fluid channels.

2. A power unit mounting device of claim 1, wherein, said fluid channels are constituted by a combination of a plurality of pipes.

3. A power unit mounting device of claim 1, wherein said auxiliary channels are different from each other in length.

4. A power unit mounting device of claim 1, wherein, said auxiliary channels are different from each other in diameter.

5. A power unit mounting device of claim 1, wherein, the resonance frequencies of the fluid masses inside the fluid channels are different from each other.

6. A power unit mounting device of claim 1, wherein, said fluid is gaseous substance.

7. A power unit mounting device of claim 6, wherein, said fluid is air.

8. A power unit mounting device of claim 1, wherein, said fluid is liquid.

9. A power unit mounting device of claim 8, wherein, said auxiliary chamber is provided with a diaphragm.

10. A power unit mounting device of claim 6, wherein, said auxiliary chamber is provided with a fluid chamber communicating with the internal space through the fluid channel and an air chamber partitioned by the diaphragm from the fluid chamber.

11. A power unit mounting device of claim 6, wherein, said selector valve is a solenoid valve.

* * * * *